US011445390B2

(12) United States Patent
Song et al.

(10) Patent No.: US 11,445,390 B2
(45) Date of Patent: Sep. 13, 2022

(54) MEASUREMENT METHOD, MEASUREMENT CONFIGURATION METHOD, TERMINAL AND NETWORK DEVICE

(71) Applicant: VIVO MOBILE COMMUNICATION CO., LTD., Guangdong (CN)

(72) Inventors: Yang Song, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 126 days.

(21) Appl. No.: 16/960,935

(22) PCT Filed: Jan. 2, 2019

(86) PCT No.: PCT/CN2019/070079

§ 371 (c)(1),
(2) Date: Jul. 9, 2020

(87) PCT Pub. No.: WO2019/137275

PCT Pub. Date: Jul. 18, 2019

(65) Prior Publication Data

US 2020/0382979 A1     Dec. 3, 2020

(30) Foreign Application Priority Data

Jan. 9, 2018   (CN) .......................... 201810020025.6

(51) Int. Cl.
*H04W 24/08* (2009.01)
*H04L 5/00* (2006.01)
*H04W 72/04* (2009.01)

(52) U.S. Cl.
CPC ........... *H04W 24/08* (2013.01); *H04L 5/0048* (2013.01); *H04W 72/042* (2013.01)

(58) Field of Classification Search
CPC .... H04B 7/024; H04B 7/0617; H04B 7/0626; H04L 5/0023; H04L 5/0035;
(Continued)

(56) References Cited

U.S. PATENT DOCUMENTS

| 2014/0362793 | A1  | 12/2014 | Chai et al. |
| 2016/0050153 | A1  | 2/2016  | Xu et al.   |
| 2017/0288743 | A1* | 10/2017 | Nam ................. H04B 7/024 |

FOREIGN PATENT DOCUMENTS

| CN | 103179664 A | 6/2013 |
| CN | 103220066 A | 7/2013 |

(Continued)

OTHER PUBLICATIONS

International Preliminary Report on Patentability and Written Opinion dated Jul. 23, 2020 issued in PCT/CN2019/070079.
(Continued)

*Primary Examiner* — Dady Chery
(74) *Attorney, Agent, or Firm* — Brooks Kushman P.C.

(57) ABSTRACT

A measurement method, a measurement configuration method, a terminal, and a network device are provided, which relate to the field of communication technology. The measurement method is applied to a terminal, and includes: obtaining resource configuration information for performing target measurement; determining a target CSI-RS port set, in the resource configuration information, for performing target measurement; and obtaining a target measurement value corresponding to the target CSI-RS port set through performing measurement; wherein the resource configuration information includes at least one resource set, each resource set includes at least one CSI-RS resource, and the target measurement includes channel measurement or interference measurement.

20 Claims, 8 Drawing Sheets

User Terminal

(58) Field of Classification Search
CPC ..... H04L 5/0053; H04L 5/006; H04L 5/0091; H04L 5/005; H04L 5/0057; H04L 5/0094; H04W 72/0406
See application file for complete search history.

(56) References Cited

FOREIGN PATENT DOCUMENTS

| | | |
|---|---|---|
| CN | 103391629 A | 11/2013 |
| CN | 105075319 A | 11/2015 |

OTHER PUBLICATIONS

Search Report dated Mar. 12, 2020 issued in Chinese Application No. 201810020025.6.
3GPP TSG RAN WG1 Meeting #90; R1-1713142; Prague, Czech Republic Aug. 21-25, 2017, "Discussion on interference measurement", 4 pages.
3GPP TSG RAN WG1 Meeting #91; R1-1719813; Reno, USA, Nov. 27-Dec. 1, 2017, "On aperiodic CSI-RS triggering", 5 pages.
3GPP TSG RAN WG1 Meeting 91; R1-1721657, Reno, USA, Nov. 27-Dec. 1, 2017, "Chairman's notes for AI 7.2 NR-MIMO", 38 pages.

* cited by examiner

MEASUREMENT METHOD, MEASUREMENT CONFIGURATION METHOD, TERMINAL AND NETWORK DEVICE

CROSS-REFERENCE TO RELATED APPLICATION

This application is a U.S. national phase application of a PCT Application No. PCT/CN2019/070079 filed on Jan. 2, 2019, which claims a priority to Chinese Patent Application No. 201810020025.6 filed in China on Jan. 9, 2018, the disclosures of which are incorporated in their entirety by reference herein.

TECHNICAL FIELD

The present disclosure relates to the field of communication technology, in particular, relates to a measurement method, a measurement configuration method, a terminal and a network device.

BACKGROUND

Massive antenna technology is introduced for New Radio (NR) in a fifth-generation (5G) mobile communication system which can better support a Multi-User Multiple-Input Multiple-Output (MU-MIMO) antenna technology. Under a condition that the MU-MIMO is supported, a base station calculates a precoding vector/matrix for each user according to Channel State Information (CSI) of each user, and then simultaneously transmits data streams to a plurality of users on the same time-frequency resource. However, since error exists in acquisition of the CSI and calculation of a precoding matrix is non-ideal, data streams of other users generate Multi-User Interference (MUI) to the user during actual transmission, a Signal-to-Interference-plus-Noise Ratio (SINR) of each user calculated at the time of scheduling by the base station is different from the SINR of each user during actual transmission, that is, a scheduled Modulation and Coding Scheme (MCS) is inaccurate, causing performance degradation.

To solve this problem, an NR system defines a Non-Zero Power Channel State Information-Reference Signal (NZP CSI-RS) for interference measurement. The base station performs preliminary multi-user scheduling and precoding matrix calculation based on the obtained CSI of each user, traffic and historical scheduling information, and then sends, through a NZP CSI-RS resource, pre-scheduled precoding information to a plurality of users to be scheduled, wherein a precoding vector of each data stream corresponds to a NZP CSI-RS port, the NZP CSI-RS of the port is sent out after a corresponding precoding operation is performed. A user distinguishes a port subjected to precoding channel measurement, in a set of NZP CSI-RS ports, for the user itself and a port for interference measurement, performs channel measurement and recalculates a CQI subjected to multi-user interference, and feeds an updated CQI back to the base station so that a more accurate Modulation and Coding Scheme (MCS) may be determined.

By transmitting a NZP CSI-RS which is precoded after multi-user pairing, each user can accurately measure and feed back CQI with MUI being considered, and an accuracy of selecting a MCS may be increased, and a system capacity may be improved. However, some requirements are put forward for configuration of CSI-RS resources. However, according to a current definition of CSI-RS resources, in some cases, the number of CSI-RS ports used for channel measurement does not completely coincide with the number of CSI-RS ports defined for one CSI-RS resource. For example, for NZP-CSI-RS-based interference measurement, after MU-MIMO pre-scheduling is performed according to an existing assumption, the number of data layers allocated for each terminal may be 1, 2, 3, or 4, which corresponds to the number of NZP CSI-RS ports used for channel measurement in the above mentioned NZP-CSI-RS-based interference measurement, while one CSI-RS resource does not support the number 3 of ports. In this case, one scheme consists of aggregation of a plurality of CSI-RS resources included in a resource set, for example, two CSI-RS resources, one of which is 2-port and the other of which is 1-port. However, it is not clear how the terminal performs channel measurement in this case, and the terminal cannot accurately feed back a CSI.

SUMMARY

A measurement method, a measurement configuration method, a terminal and a network device are provided in the embodiments of the present disclosure, in order to solve a problem that the number of CSI-RS ports for channel measurement or interference measurement does not completely coincide with the number of CSI-RS ports defined by one CSI-RS resource, and in this case, the terminal does not know how to perform the channel measurement or the interference measurement and cannot feed back an accurate measurement value to a base station.

In order to solve the above technical problems, the present disclosure adopts the following technical solutions.

In a first aspect, some embodiments of the present disclosure provide a measurement method. The method includes obtaining resource configuration information for performing target measurement; determining a target Channel State Information Reference Signal (CSI-RS) port set, in the resource configuration information, for performing target measurement; and obtaining a target measurement value corresponding to the target CSI-RS port set through performing measurement; wherein the resource configuration information includes at least one resource set, and each resource set includes at least one CSI-RS resource, and the target measurement includes channel measurement or interference measurement.

In a second aspect, some embodiments of the present disclosure provide a measurement configuration method. The method includes sending resource configuration information for target measurement to a terminal; wherein the resource configuration information includes at least one resource set, and each resource set includes at least one CSI-RS resource; and the target measurement includes channel measurement or interference measurement.

In a third aspect, some embodiments of the present disclosure provide a terminal. The terminal includes: an obtaining module, used for obtaining resource configuration information for performing target measurement; a determining module, used for determining, in the resource configuration information, a target Channel State Information Reference Signal (CSI-RS) port set for performing target measurement; a measuring module, used for obtaining a target measurement value corresponding to the target CSI-RS port set through performing measurement; wherein the resource configuration information includes at least one resource set, each resource set includes at least one CSI-RS resource; the target measurement includes channel measurement or interference measurement.

In a fourth aspect, some embodiments of the present disclosure provide a terminal. The terminal includes a storage, a processor, and a computer program stored on the storage and executed by the processor, wherein when the computer program is executed by the processor, the processor implements steps of the measurement method.

In a fifth aspect, some embodiments of the present disclosure provide a computer readable storage medium wherein a computer program is stored on the computer readable storage medium, when the computer program is executed by a processor, the processor implements steps of the measurement method.

In a sixth aspect, some embodiments of the present disclosure provide a network device. The network device includes a first sending module, used for sending resource configuration information for target measurement to a terminal; wherein the resource configuration information includes at least one resource set, and each resource set includes at least one CSI-RS resource; and the target measurement includes channel measurement or interference measurement.

In a seventh aspect, some embodiments of the present disclosure provide a network device. The network device includes a storage, a processor, and a computer program stored on the storage and executed by the processor, wherein when the computer program is executed by the processor, the processor implements steps of the measurement configuration method.

In an eighth aspect, some embodiments of the present disclosure provide a computer readable storage medium, wherein a computer program is stored on the computer readable storage medium, when the computer program is executed by a processor, the processor implements steps of the measurement configuration method.

An advantageous effect of the present disclosure is that a target CSI-RS port for performing target measurement is determined in resource configuration information, and then a target measurement value is obtained by performing the target measurement based on the target CSI-RS port, in this way, the terminal can feedback an accurate target measurement value and ensure the reliability of the network communication.

BRIEF DESCRIPTION OF THE DRAWINGS

In order to more clearly illustrate technical solutions of embodiments of the present disclosure, accompany drawings to be used in the embodiments of the present disclosure will be briefly described below. It will be apparent that, figures in the following description are merely some embodiments of the present disclosure and other figures may be obtained by those of ordinary skill in the art from these figures without any creative effort.

DETAILED DESCRIPTION

The technical solutions in the embodiments of the present disclosure will be clearly and completely described below in conjunction with the accompanying drawings in the embodiments of the present disclosure. It is apparent that the described embodiments are a part, rather than all, of the embodiments of the present disclosure. Based on the embodiments of the present disclosure, all other embodiments obtained by those of ordinary skill in the art without creative labor are within the protection scope of the present disclosure.

Such terms as "first", "second" and the like in the specification and claims of this application are used to distinguish similar objects, and need not be used to describe a particular order or sequence. It should be understood that terms used in such a way may be interchanged where appropriate in order to implement the embodiments of the present application described herein, for example, in a sequence other than those illustrated or described herein. Furthermore, such terms as "including" and "having" and any variations thereof are intended to cover non-exclusive inclusion, for example, processes, methods, systems, products, or devices that contain a series of steps or units need not be limited to those steps or units clearly listed, but may include other steps or units that are not explicitly listed or inherent to these processes, methods, products, or devices. In addition, "and/or" used in the specification and the claim means at least one of objects connected by the term, such as A and/or B indicates three cases that A exists alone, B exist alone, and both A and B exist.

In the embodiments of the present disclosure, words such as "exemplary" or "such as" are used to represent examples, illustrations, or description. Any embodiment or design described as "exemplary" or "such as" in the embodiments of the present disclosure should not be construed as being more preferable or advantageous than other embodiments or designs. To be precise, used words such as "exemplary" or "such as" are intended to present relevant concepts in a specific manner.

The embodiments of the present disclosure are described below with reference to the accompanying drawings. The measurement method, the measurement configuration method, the terminal, and the network device provided by the embodiments of the present disclosure may be applied to a wireless communication system. The wireless communication system may be a system employing a fifth-Generation (5G) mobile communication technology (hereinafter referred to as a 5G system), and one skilled in the art will appreciate that a 5G NR system is merely an example and is not a limitation.

Figure 1:
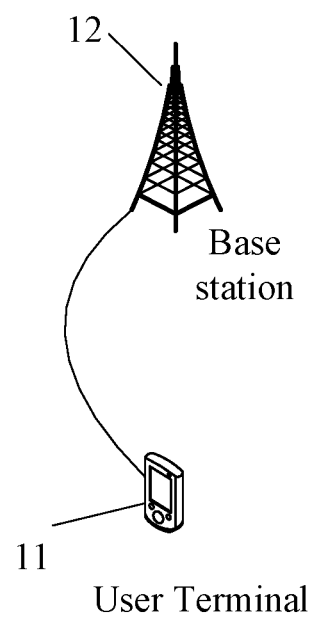
FIG. 1 shows a structural diagram of a network system applicable to some embodiments of the present disclosure.
Figure 2:
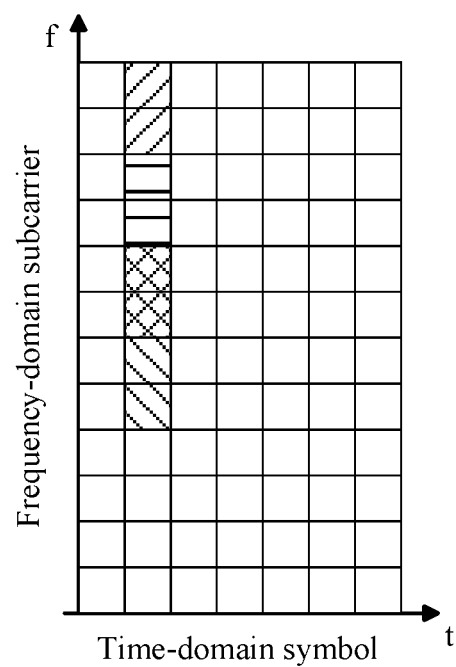
FIG. 2 is a first schematic diagram of a CSI-RS pattern representing 8 ports according to some embodiments of the present disclosure.
Figure 3:
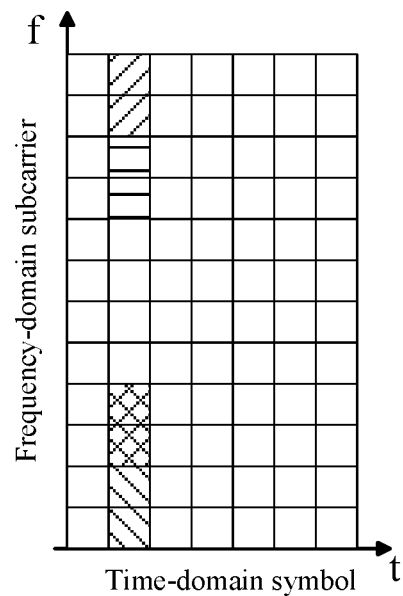
FIG. 3 is a second schematic diagram of a CSI-RS pattern representing 8 ports according to some embodiments of the present disclosure.
Figure 4:
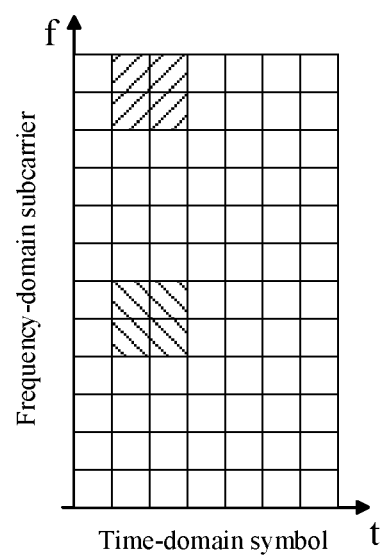
FIG. 4 is a third schematic diagram of a CSI-RS pattern representing 8 ports according to some embodiments of the present disclosure.
Figure 5:
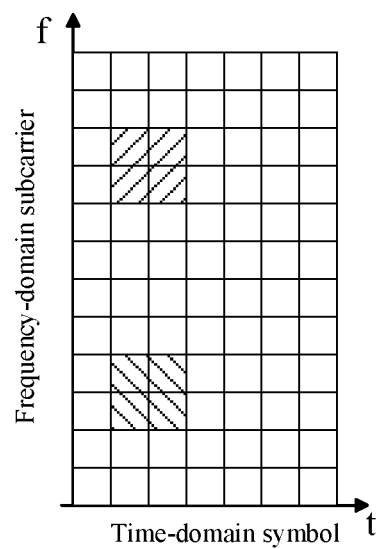
FIG. 5 is a fourth schematic diagram of a CSI-RS pattern representing 8 ports according to some embodiments of the present disclosure

Referring to FIG. 1, FIG. 1 is a structure diagram of a network system applicable to some embodiments of the present disclosure. As shown in FIG. 1, includes a user terminal 11 and a base station 12, wherein the user terminal 11 may be a User Equipment (UE), for example, may be a terminal-side device such as a mobile phone, a Tablet Personal Computer, a Laptop Computer, a personal digital assistant (PDA), a Mobile Internet Device (MID) or a Wearable Device. It should be noted that the specific type of the user terminal 11 is not limited in the embodiments of the present disclosure. The above base station 12 may be a base station (e.g., gNB, 5G NR NB) in the 5G and a later version, or a base station in other communication systems or referred to as a Node B. In the embodiments of the present disclosure, only a 5G base station is only taken as an examples, but the specific type of base station 12 is not limited.

In description of the embodiments of the present disclosure, some concept used in the following description are first explained.

Description in a protocol is as follows.

1) each trigger state configured by a higher-level parameter ReportTrigger (which is used for reporting configuration of a trigger) is associated with one or more ReportConfig (i.e., report setting), where each ReportConfig corresponds to one or more periodic, or semi-persistent, or non-periodic resource settings;

2) if one resource setting is configured, then the resource setting is used for channel measurement or calculation of an L1 Reference Signal Receiving Power (Layer-1-RSRP);

3) if two resource settings are configured, a first resource setting is used for channel measurement or a second resource setting is used for a CSI-based interference measurement (CSI-IM) which generally refers to Zero-Power (ZP) CSI-RS interference measurement or NZP CSI-RS interference measurement;

4) if three resource setting are configured, the first resource setting is used for channel measurement, the second resource setting is CSI-IM-based interference measurement, and the third resource setting is NZP-CSI-RS-based interference measurement.

A configuration method of an aperiodic CSI-RS is as follows.

A1: M resource settings, where M≥1;

A2: a resource configuration includes S CSI-RS resource sets, where S M≥1;

A3: a resource set includes Ks CSI-RS resources, where Ks≥1;

A4: a CSI-RS resource indicates the number of CSI-RS ports, information describing time-frequency positions, and the like, and indicates a CSI-RS pattern used.

The number of CSI-RS ports of a CSI-RS resource is 1, 2, 4, 8, 12, 16, 24, 32.

Figure 6:
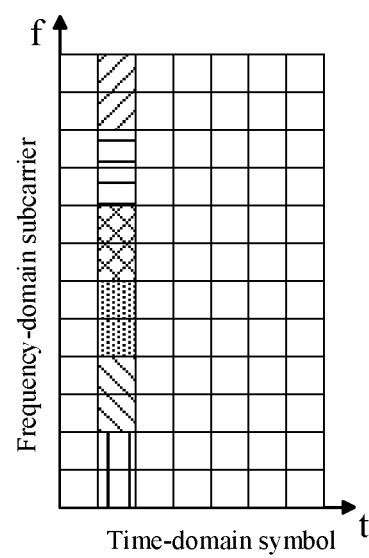
FIG. 6 is a first schematic diagram of a CSI-RS pattern representing 12 ports according to some embodiments of the present disclosure.
Figure 7:
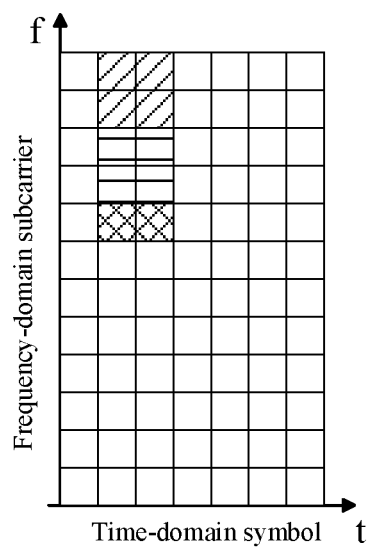
FIG. 7 is a second schematic diagram of a CSI-RS pattern representing 12 ports according to some embodiments of the present disclosure.
Figure 8:
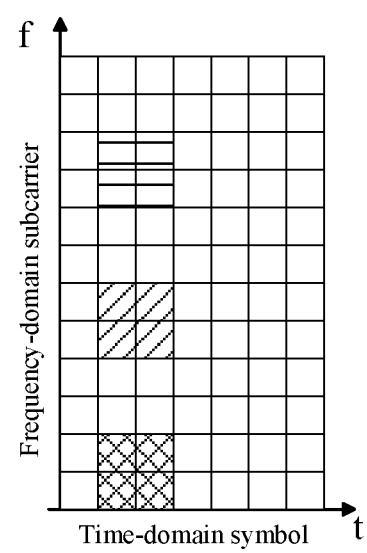
FIG. 8 is a third schematic diagram of a CSI-RS pattern representing 12 ports according to some embodiments of the present disclosure.

Specifically, as shown in FIG. 2 to FIG. 5, FIG. 2 to FIG. 5 are schematic diagrams of 8-port CSI-RS patterns, and as shown in FIG. 6 to FIG. 8, FIG. 6 to FIG. 8 are schematic diagrams of 12-port CSI-RS pattern.

A MU-MIMO dimension supported by a Demodulation Reference Signal (DMRS) is currently determined as follows: a DMRS configuration type 1 supports up to 8 orthogonal DMRS ports, a DMRS configuration type 2 supports up to 12 orthogonal DMRS ports. One DMRS port may occupy 1 or 2 OFDM symbols. In a case where a DMRS port in the DMRS configuration type 1 occupies 1 OFDM symbol, up to 2 layers are allocated to each MU-MIMO terminal, that is, corresponding to 2 DMRS ports; in other DMRS configurations, up to 4 layers are allocated to each MU-MIMO terminal.

For an aperiodic CSI-RS, resource configuration, a set of CSI-RS resources, and included CSI-RS resources need to be sent to the terminal through a Radio Resource Control (RRC), and then transmission of the set of CSI-RS resources therein and a specific CSI-RS resource is selected and triggered through a Downlink Control Information (DCI) signaling.

Figure 9:
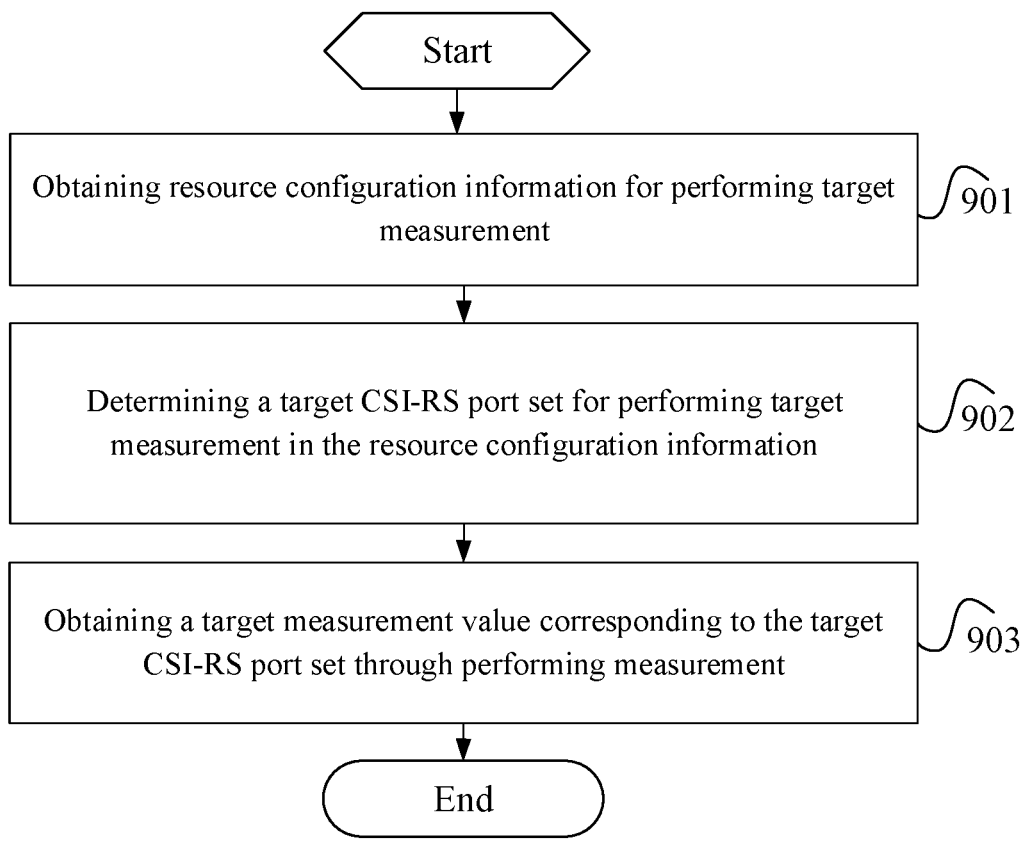
FIG. 9 is a flowchart of a measurement method according to some embodiments of the present disclosure.

Specifically, as shown in FIG. 9, FIG. 9 is a flowchart of a measurement method according to some embodiments of the present disclosure. The measurement method is applied to a terminal and includes steps 901-903.

Step 901: obtaining resource configuration information for performing target measurement.

It should be noted that the resource configuration information includes at least one resource set, and each resource set includes at least one CSI-RS resource and is typically configured by a network device and sent to the terminal; the target measurement includes channel measurement or interference measurement.

Step 902: determining a target Channel State Information Reference Signal (CSI-RS) port set for performing target measurement in the resource configuration information.

Step 903: obtaining a target measurement value corresponding to the target CSI-RS port set through performing measurement.

Specifically, first implementation of the step 902 is determining all CSI-RS ports of all CSI-RS resources in the same resource set in the resource configuration information as the target CSI-RS port set.

It should be noted that a CSI-RS port determination manner is a default determination manner, that is, when the terminal performs target measurement, the entire CSI-RS ports (i.e., all CSI-RS ports) of the entire CSI-RS resources (i.e. all CSI-RS resources) in the same resource set are selected by default for measurement, i.e., all CSI-RS ports are used as a whole for performing target measurement jointly. In this case, a target measurement value finally obtained is one, for example, when channel measurement is performed, a CSI is finally obtained by using a target measurement value obtained through the channel measurement. It should be noted that the CSI may be calculated from the measurement value obtained through the channel measurement, or may be calculated jointly from measurement values obtained through channel measurement and interference measurement respectively. A network device configures and selects resources contained in the resource set through an RRC signaling as needed.

Specifically, second implementation of step 902 is obtaining an indication parameter for determining the target CSI-RS port set for target measurement; and determining the target CSI-RS port set in the resource configuration information according to the indication parameter.

It should be noted that the method of determining the target CSI-RS port is a method indicated by the network device, that is, the network device informs the terminal of a way in which measurement is performed, and the terminal determines the target CSI-RS port according to the way.

Specifically, the method of obtaining the indication parameter for determining the target CSI-RS port set for the target measurement is: receiving the indication parameter, sent by a network device, of the target CSI-RS port set for determining the target measurement; wherein the indication parameter is carried in at least one of a Radio Resource Control (RRC) signaling, an Medium Access Control (MAC) Control Element (CE), and Downlink Control Information (DCI).

Specifically, the indication parameter is used to indicate one of the following B1-B4.

B1: whether the target CSI-RS port set is determined by all CSI-RS ports of all CSI-RS resources in the same resource set in the resource configuration information.

It should be noted that this implementation is similar to the default implementation described above and will not be described here.

B2: whether the target CSI-RS port set is determined by a CSI-RS port of a predetermined CSI-RS resource in the same resource set in the resource configuration information, and in a case where the indication parameter indicates that the target CSI-RS port set is determined by a CSI-RS port of a predetermined CSI-RS resource in the same resource set in the resource configuration information, the indication parameter further includes identification information of the predetermined CSI-RS resource used for determining the target CSI-RS port set.

It should be noted that in a case where the indication parameter indicates that a CSI is measured by a CSI-RS port of a predetermined CSI-RS resource in the resource configuration information, the network device also needs to inform the terminal of identification information of the used resource set and/or identification information of a CSI-RS resource. Specifically, the identification information may be a resource set number and/or a CSI-RS resource number, or a bitmap pattern of the resource set number and/or a bitmap pattern of the CSI-RS resource number.

B3: identification information of a CSI-RS resource, used to determine the target CSI-RS port set, in the same resource set in the resource configuration information;

It should be noted that in this case, the network device directly informs the terminal of which CSI-RS resources are specifically used for the target measurement, for example, the network device directly informs the terminal of the CSI-RS resource number or the bitmap pattern of the CSI-RS resource number.

B4: identification information of a CSI-RS port, used for determining the target CSI-RS port set, in a CSI-RS resource in the same resource set in the resource configuration information.

It should be noted that, in this case, the network device directly informs the terminal of which CSI-RS port is specifically used, for example, the network device directly informs the terminal of the identification information of the CSI-RS port. Specifically, the identification information of the CSI-RS port may be a port set number and/or a CSI-RS port number, or a bitmap pattern of the port set number and/or a bitmap pattern of the CSI-RS port number.

Further, in a case that a plurality of CSI-RS resources exists in one resource set, the indication parameter is further configured to indicate identification information of a CSI-RS resource where the CSI-RS port corresponding to the identification information of the CSI-RS port is located, so as to facilitate the terminal to distinguish a resource to which the used CSI-RS port belongs. Specifically, the identification information of the CSI-RS resource may be a resource set number and/or a CSI-RS resource number, or a bitmap pattern of a resource set number and/or a bitmap pattern of a CSI-RS resource number.

In a case of B4, the network device only instructs the terminal to perform target measurement using a port in a CSI-RS resource, a port in the same CSI-RS resource is only included in the target CSI-RS port set determined by the terminal. In cases of B1-B3, the network device may instruct the terminal to perform target measurement using ports in a plurality of CSI-RS resources, ports in a plurality of CSI-RS resources may be included in the target CSI-RS port set determined by the terminal.

It should be noted that target CSI-RS ports determined by the terminal are different because contents indicated by the indication parameters are different. Implementation processes for determining the target CSI-RS port by the terminal are described in detail below in respect of different indication contents of the indication parameters.

First, the indication parameter is used to indicate whether the target CSI-RS port set is determined by all CSI-RS ports of all CSI-RS resources in the same resource set in the resource configuration information.

Specifically, a method of determining the target CSI-RS port set in the resource configuration information according to the indication parameter is: when the indication parameter indicates that the target CSI-RS port set is determined by all CSI-RS ports of all CSI-RS resources in the same resource set in the resource configuration information, determining all CSI-RS ports of all CSI-RS resources in the same resource set in the resource configuration information as one target CSI-RS port set; or when the indication parameter indicates that the target CSI-RS port set is not determined by all CSI-RS ports of all CSI-RS resources in the same resource set in the resource configuration information, determining all CSI-RS ports of each CSI-RS resource in the same resource set in the resource configuration information as one target CSI-RS port set.

It should be noted that when the terminal determines all CSI-RS ports of all CSI-RS resources in the resource configuration information as one target CSI-RS port set, the target CSI-RS port set includes CSI-RS ports in a plurality of different resources, the terminal collectively performs a target measurement using a plurality of CSI-RS ports, obtains a target measurement value; when all CSI-RS ports of each CSI-RS resource in one resource set in the resource configuration information are determined as one target CSI-RS port set. Since the target CSI-RS port set is determined according to each CSI-RS resource and is also measured per each resource when performing the target measurement, the number of target measurement values obtained is equal to the number of CSI-RS resources used when performing measurement in such a case.

Second, the indication parameter is used to indicate whether the target CSI-RS port set is determined by a CSI-RS port of a predetermined CSI-RS resource in the same resource set in the resource configuration information.

Specifically, a method of determining the target CSI-RS port set in the resource configuration information according to the indication parameter is: obtaining identification information of a predetermined CSI-RS resource for measuring a CSI when the indication parameter indicates that the target CSI-RS port set is determined by the CSI-RS port of the predetermined CSI-RS resource in the same resource set in the resource configuration information, and determining all CSI-RS ports of a CSI-RS resource indicated by the identification information of the predetermined CSI-RS resource as a target CSI-RS port set; or when the indication parameter indicates that the target CSI-RS port set is not determined by a CSI-RS port of a predetermined CSI-RS resource in the same resource set in the resource configuration information, determining all CSI-RS ports of each CSI-RS resource in the same resource set in the resource configuration information as a target CSI-RS port set.

It should be noted that when all CSI-RS ports of a CSI-RS resource indicated by the identification information of the predetermined CSI-RS resource are determined as a target CSI-RS port set, since the target CSI-RS port set includes CSI-RS ports in a plurality of different resources, the terminal collectively performs target measurement using a plurality of CSI-RS ports to obtain a target measurement value, and when all CSI-RS ports of each CSI-RS resource in the resource configuration information are determined as a target CSI-RS port set, since the target CSI-RS port set is determined according to each CSI-RS resource and is also measured per each resource when performing the target measurement, in this case, the number of CSI-RS resources used in performing measurement is the same as the number of obtained target measurement values.

Third, the indication parameter indicates identification information of a CSI-RS resource, used for determining the target CSI-RS port set, in the same resource set in the resource configuration information.

Specifically, a method of determining the target CSI-RS port set in the resource configuration information according to the indication parameter is: determining all CSI-RS ports of the CSI-RS resource indicated by identification information of the CSI-RS resource as one target CSI-RS port set.

For example, the indication parameter is a bitmap pattern, a length of the bitmap pattern is the number of CSI-RS resource numbers in the resource set, 1 indicates that a CSI-RS resource is used for aggregated (joint) CSI measurement, and 0 indicates that a CSI-RS resource is used for performing independent CSI measurement.

It should be noted that the target CSI-RS port set determined in this manner includes CSI-RS ports in a plurality of different resources, and the terminal collectively performs target measurement using the CSI-RS ports to obtain a target measurement value.

Fourth, the indication parameter indicates identification information of a CSI-RS port, used for determining the target CSI-RS port set, in a CSI-RS resource in the same resource set in the resource configuration information.

Specifically, a method of determining the target CSI-RS port set in the resource configuration information according to the indication parameter is: determining all CSI-RS ports indicated by the identification information of a CSI-RS port as one target CSI-RS port set.

It should be noted that the target CSI-RS port set determined in this manner only includes CSI-RS ports in a CSI-RS resource, and the terminal collectively performs target measurement using the CSI-RS ports to obtain a target measurement value.

It should be noted that the network device may indicate, to the terminal in an appropriate manner according to a network usage condition, how to determine the target CSI-RS port set.

It should be noted that all implementations described above are to determine a CSI-RS port used for performing target measurement in the same resource set. Specifically, a resource set used by the terminal may be indicated by the network device through a signaling.

Various cases are exemplified below by taking, as an example, a case where the terminal performs channel measurement and obtains a CSI as a target measurement value. Assuming that a resource set includes 3 CSI-RS resources, wherein a CSI-RS resource 0 includes 2 CSI-RS ports, a CSI-RS resource 1 includes 2 CSI-RS ports, a CSI-RS resource 2 includes 1 CSI-RS port, and these CSI-RS ports do not overlap with each other in time and frequency.

When the terminal uses the default method for determining a port, the terminal obtains one CSI by performing measurement directly based on all 5 CSI-RS ports contained in the 3 CSI-RS resources in the resource set.

When the terminal uses the first indication parameter described above for determining a port, when the indication parameter indicates that the target CSI-RS port set is determined by all CSI-RS ports of all CSI-RS resources in the same resource set in the resource configuration information, the terminal obtains a CSI by performing measurement based on all 5 CSI-RS ports contained in 3 CSI-RS resources in the resource set; when the indication parameter indicates that the target CSI-RS port set is not determined by all CSI-RS ports of all CSI-RS resources in the same resource set in the resource configuration information, the terminal obtains three CSIs by performing measurement based on various CSI-RS resources in the resource set, respectively.

When the terminal uses the second indication parameter described above for determining a port, when the indication parameter indicates that the target CSI-RS port set is determined by a CSI-RS port of a predetermined CSI-RS resource in the same resource set in the resource configuration information, and CSI-RS resource numbers for measuring a CSI are 0, 2 (which may be indicated by a bitmap or other means), the terminal obtains a CSI by performing measurement based on 3 CSI-RS ports contained in the CSI-RS resource 0 and the CSI-RS resource 2 in the resource set; when the indication parameter indicates that the target CSI-RS port set is not determined by a CSI-RS port of a predetermined CSI-RS resource in the same resource set in the resource configuration information, the terminal measures three CSIs based on various CSI-RS resources in the resource set, respectively.

When the terminal uses the third indication parameter described above for determining a port, when the indication parameter indicates that CSI-RS resource numbers for measuring a CSI are 0, 2 (which may be indicated by a bitmap or other means), the terminal obtains a CSI by performing measurement based on 3 CSI-RS ports contained in the CSI-RS resource 0 and the CSI-RS resource 2 in the resource set; when the indication parameter indicates that the CSI-RS resource number for measuring a CSI is 1, the terminal obtains a CSI based on the 2 CSI-RS ports contained in the CSI-RS resource 1 in the resource set.

When the terminal uses the fourth indication parameter described above for determining a port, when the indication parameter indicates that a CSI-RS resource number for measuring a CSI is 0 (which may be indicated by a bitmap or other means) and a first CSI-RS port is used, the terminal obtains a CSI by performing measurement based on the first CSI-RS port in a CSI-RS resource 0 in the resource set.

In the embodiment of the present disclosure, a target CSI-RS port used for performing target measurement in the resource configuration information is determined, and a target measurement value is obtained by performing target measurement based on the target CSI-RS port. In this way, the terminal can feedback an accurate target measurement value and ensure reliability of network communication.

Figure 10:
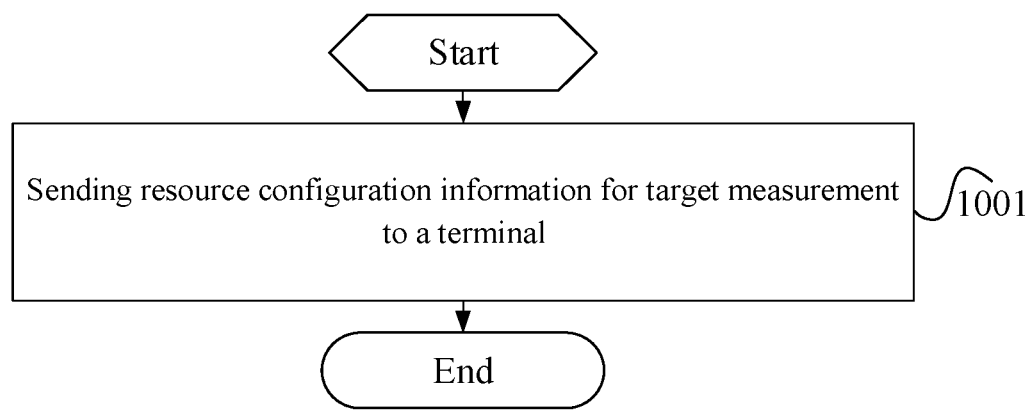
FIG. 10 is a flowchart of a measurement configuration method according to some embodiments of the present disclosure.

As shown in FIG. 10, some embodiments of the present disclosure further provides a measurement configuration method applied to a network device. The measurement configuration method includes a step 1011.

Step 1001: sending resource configuration information for target measurement to a terminal.

The resource configuration information includes at least one resource set, and each resource set includes at least one CSI-RS resource; and the target measurement includes channel measurement or interference measurement.

Further, the measurement configuration method further includes: sending, to a terminal, an indication parameter for determining a target CSI-RS port set for the target measurement; wherein the indication parameter is carried in at least one of a Radio Resource Control (RRC) signaling, a Medium Access Control (MAC) Control Element (CE), and Downlink Control Information (DCI).

Specifically, the indication parameter is used to indicate one of the following: whether the target CSI-RS port set is determined by all CSI-RS ports of all CSI-RS resources in the same resource set in the resource configuration information; whether the target CSI-RS port set is determined by a CSI-RS port of a predetermined CSI-RS resource in the same resource set in the resource configuration information, and in a case where the indication parameter indicates that the target CSI-RS port set is determined by a CSI-RS port of a predetermined CSI-RS resource in the same resource set in the resource configuration information, the indication parameter further includes identification information of the predetermined CSI-RS resource used for determining the target CSI-RS port set; identification information of a CSI-RS resource, used for determining the target CSI-RS port set, in the same resource set in the resource configuration information; identification information of a CSI-RS port, used for determining the target CSI-RS port set, in a CSI-RS resource in the same resource set of the resource configuration information.

Specifically, when the indication parameter indicates identification information of a CSI-RS port, used for determining the target CSI-RS port set, in a CSI-RS resource in the same resource set in the resource configuration information, the indication parameter is further used to indicate identification information of a CSI-RS resource where the CSI-RS port corresponding to the identification information of the CSI-RS port is located.

It should be noted that all description about a network-device side in the above embodiments are applicable to the embodiment of the measurement configuration method applied to the network-device side, and the same technical effect can be achieved.

Figure 11:
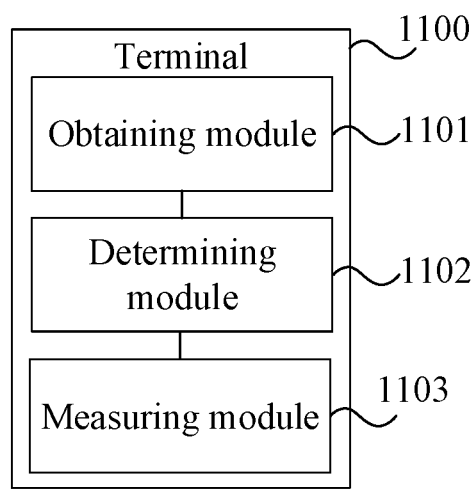
FIG. 11 is a schematic diagram of blocks in a terminal according to some embodiments of the present disclosure.

As shown in FIG. 11, some embodiments of the present disclosure further provide a terminal 1100. The terminal 1100 includes: an obtaining module 1101, a determining module 1102, and a measuring module 1103.

The obtaining module 1101 is used for obtaining resource configuration information for performing target measurement. The determining module 1102 is used for determining, in the resource configuration information, a target Channel State Information Reference Signal (CSI-RS) port set for performing target measurement.

The measuring module 1103 is used for obtaining a target measurement value corresponding to the target CSI-RS port set through performing measurement.

The resource configuration information includes at least one resource set, and each resource set includes at least one CSI-RS resource; the target measurement includes channel measurement or interference measurement.

Further, the determining module 1102 is used for determining all CSI-RS ports of all CSI-RS resources in the same resource set in the resource configuration information as the target CSI-RS port set.

Further, the determining module 1102 includes an obtaining submodule, used for obtaining an indication parameter for determining the target CSI-RS port set for the target measurement; and a determining submodule, used for determining the target CSI-RS port set in the resource configuration information according to the indication parameter.

Specifically, the obtaining submodule includes a receiving unit, used for receiving an indication parameter, sent by a network device, for determining the target CSI-RS port set for the target measurement; wherein the indication parameter is carried in at least one of a Radio Resource Control (RRC) signaling, an Medium Access Control (MAC) Control Element (CE), and Downlink Control Information (DCI).

Specifically, the indication parameter is used to indicate one of the following: whether the target CSI-RS port set is determined by all CSI-RS ports of all CSI-RS resources in the same resource set in the resource configuration information; whether the target CSI-RS port set is determined by a CSI-RS port of a predetermined CSI-RS resource in the same resource set in the resource configuration information, and in a case where the indication parameter indicates that the target CSI-RS port set is determined by a CSI-RS port of a predetermined CSI-RS resource in the same resource set in the resource configuration information, the indication parameter further includes identification information of a predetermined CSI-RS resource used for determining the target CSI-RS port set; identification information of a CSI-RS resource, used to determine the target CSI-RS port set, in the same resource set in the resource configuration information; identification information of a CSI-RS port, used for determining the target CSI-RS port set, in a CSI-RS resource in the same resource set in the resource configuration information.

Specifically, when the indication parameter is used for indicating whether the target CSI-RS port set is determined by all CSI-RS ports of all CSI-RS resources in the same resource set in the resource configuration information, the determining submodule is used for: when the indication parameter indicates that the target CSI-RS port set is determined by all CSI-RS ports of all CSI-RS resources in the same resource set in the resource configuration information, determining all CSI-RS ports of all CSI-RS resources in the same resource set in the resource configuration information as one target CSI-RS port set; or when the indication parameter indicates that the target CSI-RS port set is not determined by all CSI-RS ports of all CSI-RS resources in the same resource set in the resource configuration information, determining all CSI-RS ports of each CSI-RS resource in the same resource set in the resource configuration information as one target CSI-RS port set.

Specifically, when the indication parameter is used to indicate whether the target CSI-RS port set is determined by a CSI-RS port of a predetermined CSI-RS resource in the same resource set in the resource configuration information, the determining submodule is used for: when the indication parameter indicates that the target CSI-RS port set is determined by a CSI-RS port of a predetermined CSI-RS resource in the same resource set in the resource configuration information, acquiring identification information of a predetermined CSI-RS resource for measuring a CSI, determining, as a target CSI-RS port set, all CSI-RS ports of a CSI-RS resource indicated by the identification information of the predetermined CSI-RS resource; or when the indication parameter indicates that the target CSI-RS port set is not determined by a CSI-RS port of a predetermined CSI-RS resource in the same resource set in the resource configuration information, determining all CSI-RS ports of each CSI-RS resource in the same resource set in the resource configuration information as one target CSI-RS port set.

Specifically, when the indication parameter indicates identification information of a CSI-RS resource, used for determining the target CSI-RS port set, in the same resource set in the resource configuration information, the determining submodule is used for: determining, as one target CSI-RS port set, all CSI-RS ports of a CSI-RS resource indicated by the identification information of the CSI-RS resource.

Specifically, when the indication parameter indicates identification information of a CSI-RS port, used for determining the target CSI-RS port set, in a CSI-RS resource in the same resource set in the resource configuration information, the indication parameter is further used to indicate identification information of a CSI-RS resource where a CSI-RS port corresponding to the identification information of the CSI-RS port is located.

Specifically, when the indication parameter indicates identification information of a CSI-RS port, used for determining the target CSI-RS port set, in a CSI-RS resource in the same resource set in the resource configuration information, the determining submodule is used for: determining all CSI-RS ports indicated by the identification information of a CSI-RS port as one target CSI-RS port set.

The terminal 1100 provided in the embodiment of the present disclosure can implement various processes implemented by the terminal 1100 in the method embodiment of FIG. 9, and will not be described here again in order to avoid repetition. The terminal 1100 of the embodiment of the present disclosure determines a target CSI-RS port for performing target measurement in resource configuration information, and then obtains a target measurement value by performing the target measurement based on the target CSI-RS port. In this way, the terminal can feedback an accurate target measurement value and ensure the reliability of the network communication.

Figure 12:
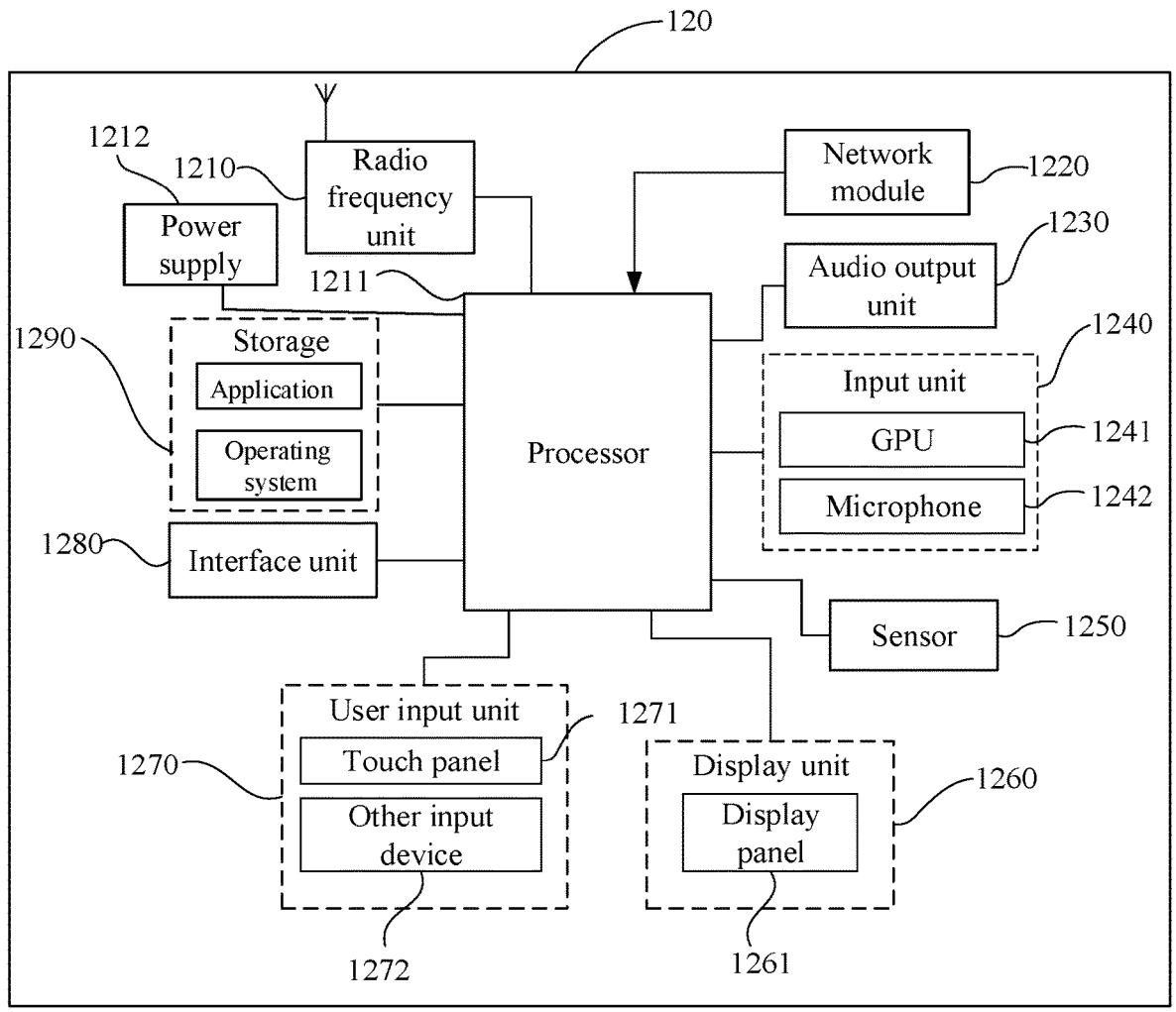
FIG. 12 is a structural block diagram of a terminal according to some embodiments of the present disclosure.

FIG. 12 is a schematic diagram of a hardware structure of a terminal implementing some embodiments of the present disclosure.

The terminal 120 includes, but is not limited to, a radio frequency unit 1210, a network module 1220, an audio output unit 1230, an input unit 1240, a sensor 1250, a display unit 1260, a user input unit 1270, an interface unit 1280, a storage 1290, a processor 1211, and a power supply 1212, and other components. Those skilled in the art will appreciate that a structure of the terminal shown in FIG. 12 does not constitute a limitation of a terminal. The terminal may include more or fewer components than illustrated, or combine certain components, or different component arrangements. In some embodiments of that present disclosure, the terminal includes, but is not limited to, a mobile phone, a tablet computer, a notebook computer, a palmtop computer, an in-vehicle terminal, a wearable device, a pedometer, and the like.

The processor 1211 is used for obtaining resource configuration information for performing target measurement; determining a target Channel State Information Reference Signal (CSI-RS) port set for performing the target measurement in the resource configuration information; obtaining a target measurement value corresponding to the target CSI-RS port set through performing measurement; wherein the resource configuration information includes at least one resource set, and each resource set includes at least one CSI-RS resource, and the target measurement includes channel measurement or interference measurement.

The terminal of the embodiment of the present disclosure determines a target CSI-RS port for performing target measurement in resource configuration information, and then obtains a target measurement value by performing the target measurement based on the target CSI-RS port. In this way, the terminal can feedback an accurate target measurement value and ensure the reliability of the network communication.

It should be understood that, in the embodiment of the present disclosure, the radio frequency unit 1210 is used for receiving and transmitting signals in processes of transmitting and receiving information or talking. Specifically, after the radio frequency unit 1210 receives downlink data from the base station, and the downlink data is transferred by the radio frequency unit 1210 to the processor 1211 for processing; and additionally the radio frequency unit 1210 sends uplink data to a network device. Generally, the radio frequency unit 1210 includes, but is not limited to, an antenna, at least one amplifier, a transceiver, a coupler, a low noise amplifier, a duplexer, and the like. In addition, the radio frequency unit 1210 may also communicate with a network and other devices through a wireless communication system.

The terminal provides a wireless broadband internet access to a user through the network module 1220, such as helping the user to send and receive emails, browse web pages, access streaming media, and the like.

The audio output unit 1230 may convert audio data received by the radio frequency unit 1210 or the network module 1220 or stored in the storage 1290 into an audio signal and output the audio signal as sound. The audio output unit 1230 may also provide audio output (e.g., a call signal reception sound, a message reception sound, etc.) related to a specific function performed by the terminal 120. The audio output unit 1230 includes a speaker, a buzzer, a receiver, and the like.

The input unit 1240 is used to receive an audio or video signal. The input unit 1240 may include a Graphics Processing Unit (GPU) 1241 and a microphone 1242. The graphics processing unit 1241 processes image data of a still picture or a video obtained by an image capturing device such as a camera in a video capturing mode or an image capturing mode. The processed image frame may be displayed on the display unit 1260. Image frames processed by the graphics processing unit 1241 may be stored in the storage 1290 (or other storage media) or sent via the radio frequency unit 1210 or the network module 1220. The microphone 1242 may receive sound and be able to process such sound into audio data. The processed audio data may be converted, in a case of a telephone call mode, into a format output that may be sent to a mobile communication network device via the radio frequency unit 1210.

The terminal 120 also includes at least one sensor 1250, such as a light sensor, a motion sensor, and other sensors. In particular, the light sensor includes an ambient light sensor and a proximity sensor, wherein the ambient light sensor may adjust brightness of the display panel 1261 according to brightness of ambient light. The proximity sensor may turn off the display panel 1261 and/or a backlight when the terminal 120 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 1250 may further include a fingerprint sensor, a pressure sensor, an iris sensor, a molecular sensor, a gyroscope, a barometer, a hygrometer, a thermometer, an infrared sensor, and the like, which will not be described herein.

The display unit 1260 is used to display information inputted by the user or information provided to the user. The display unit 1260 may include a display panel 1261 that may be configured in the form of a Liquid Crystal Display (LCD), an Organic Light-Emitting Diode (OLED), or the like.

The user input unit 1270 may be used to receive inputted digital or character information and generate a key signal input related to user-setting and function control of a terminal. Specifically, the user input unit 1270 includes a touch panel 1271 and other input devices 1272. The touch panel 1271, also referred to as a touch screen, may collect a touch operation (e.g., an operation of a user using any suitable object or accessory, such as a finger, stylus, or the like, on or near the touch panel 1271) of the user on or near the touch panel 1271. The touch panel 1271 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 1211, and receives and executes commands from the processor 1211. In addition, the touch panel 15071 may be implemented in various types such as a resistance type, a capacitance type, an infrared ray, and a surface acoustic wave. The user input unit 1270 may also include other input devices 1272 in addition to the touch panel 1271. Specifically, the other input devices 1272 may include, but are not limited to, a physical keyboard, function keys (such as volume control keys, switch keys, etc.), a trackball, a mouse, and a joystick, which will not be described herein.

Further, the touch panel 1271 may be overlaid on the display panel 1261, and after the touch panel 1271 detects a touch operation on or near the touch panel 1271, the touch operation is sent by touch panel 1271 to the processor 1211 to determine the type of a touch event. The processor 1211 then provides a corresponding visual output on the display panel 1261 according to the type of the touch event. Although in FIG. 12, the touch panel 1271 and the display panel 1261 are two separate components for implementing input and output functions of the terminal, the input and output functions of the terminal in some embodiments may be realized by integrating the touch panel 1271 with the display panel 1261, and the present disclosure is not limited thereto.

The interface unit 1280 is an interface in which an external device is connected to the terminal 120. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 1280 may be used to receive input (e.g., data information, power, etc.) from an external device and transmit the received input to one or more elements within the terminal 120 or may be used to transmit data between the terminal 120 and the external device.

The storage 1290 may be used to store software programs and various types of data. The storage 1290 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 1290 may include a high speed random access memory, and may also include a non-transitory memory, such as at least one disk storage device, a flash memory device, or other volatile solid state storage device.

The processor 1211 is a console of the terminal, connects various parts of the entirety of the terminal using various interfaces and lines, and executes various functions and processes data of the terminal by running or executing software programs and/or modules stored in the storage 1290, and by calling data stored in the storage 1290, thereby integrally monitoring the terminal. The processor 1211 may include one or more processing units; optionally, the processor 1211 may integrate an application processor and a modem processor, wherein the application processor primarily processes an operating system, a user interface, an application program, etc. The modem processor mainly handles wireless communication. It will be appreciated that the above-described modem processor may also not be integrated into the processor 1211.

The terminal 120 may also include a power supply 1212 (such as a battery) that supplies power to various components, optionally, the power supply 1212 may be logically connected to the processor 1211 via a power management system. Thus, functions such as charging, discharging, and power consumption management are managed by the power management system.

In addition, the terminal 120 includes some functional modules (not shown), which will not be described here.

Optionally, the embodiments of the present disclosure also provide a terminal. The terminal includes a processor 1210, a storage 1290, a computer program stored on the storage 1290 and executable by the processor 1211, wherein when the computer program is executed by the processor 1211, each process of the above-described embodiments of the measurement method is realized, and the same technical effect can be achieved, and the description thereof is omitted here to avoid repetition.

The embodiments of the present disclosure also provide a computer readable storage medium on which a computer program is stored. When the computer program is executed by a processor, the processor implements various processes of the embodiments of the measurement method, and can achieve the same technical effect. In order to avoid duplication, the various processes will not be repeated herein. The computer-readable storage medium is, for example, a Read-Only Memory (ROM), a Random Access Memory (RAM), a magnetic disk or an optical disk.

Figure 13:
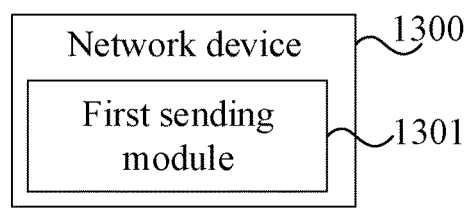
FIG. 13 is a schematic diagram of blocks in a network device according to some embodiments of the present disclosure.

As shown in FIG. 13, some embodiments of the present disclosure further provide a network device 1300. The network device 1300 includes a first sending module 1301, used for sending resource configuration information for target measurement to a terminal; wherein the resource configuration information includes at least one resource set, and each resource set includes at least one CSI-RS resource; and the target measurement includes channel measurement or interference measurement.

Further, the network device 1300 further includes a second sending module, used for sending, to a terminal, an indication parameter for determining a target CSI-RS port set for the target measurement; wherein the indication parameter is carried in at least one of a Radio Resource Control (RRC) signaling, a Medium Access Control (MAC) Control Element (CE), and Downlink Control Information (DCI).

Specifically, the indication parameter is used to indicate one of the following: whether the target CSI-RS port set is determined by all CSI-RS ports of all CSI-RS resources in the same resource set in the resource configuration information; whether the target CSI-RS port set is determined by a CSI-RS port of a predetermined CSI-RS resource in the same resource set in the resource configuration information, and in a case where the indication parameter indicates that the target CSI-RS port set is determined by a CSI-RS port of a predetermined CSI-RS resource in the same resource set in the resource configuration information, the indication parameter further includes identification information of the predetermined CSI-RS resource used for determining the target CSI-RS port set; identification information of a CSI-RS resource, used for determining the target CSI-RS port set, in the same resource set in the resource configuration information; identification information of a CSI-RS port, used for determining the target CSI-RS port set, in a CSI-RS resource in the same resource set of the resource configuration information.

Specifically, when the indication parameter indicates identification information of a CSI-RS port, used for determining the target CSI-RS port set, in a CSI-RS resource in the same resource set in the resource configuration information, the indication parameter is further used to indicate identification information of a CSI-RS resource where the CSI-RS port corresponding to the identification information of the CSI-RS port is located.

It should be noted that the embodiment of the network device is a network device corresponding to the measurement configuration method applied to the network-device side as described above, and all implementations of the above embodiments are applicable to the embodiment of the network device, the same technical effect can also be achieved.

The embodiments of the present disclosure also provide a network device. The network device includes a storage, a processor, and a computer program stored on the storage and executable by the processor. When the computer program is executed by the processor, each process in the embodiment of the measurement configuration method described above is realized, and the same technical effect can be achieved, and description thereof is omitted here to avoid repetition.

Some embodiments of that present disclosure also provide a computer readable storage medium, wherein a computer program is stored on the computer readable storage medium. When the computer program is executed by a processor, each process in the embodiment of the measurement configuration method described above is realized, and the same technical effect can be achieved, and description thereof is omitted here to avoid repetition. The computer readable storage medium is, for example, a Read-Only Memory (ROM), a Random Access Memory (RAM), a disk or an optical disk.

Figure 14:
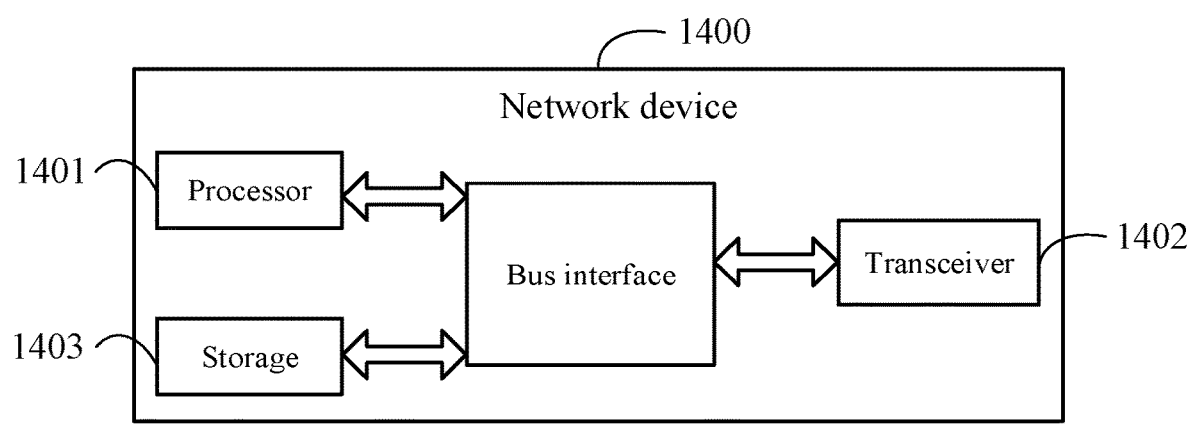
FIG. 14 is a structural block diagram of a network device according to some embodiments of the present disclosure.

FIG. 14 is a structural diagram of a network device according to some embodiments of the present disclosure, which can realize the details of the measurement configuration method applied to the network-device side and achieve the same effect. As shown in FIG. 14, the network device 1400 includes a processor 1401, a transceiver 1402, a storage 1403, and a bus interface, wherein the processor 1401 is used for reading a program in the storage 1403 and performing the following processes: sending resource configuration information for target measurement to a terminal through the transceiver 1402.

The resource configuration information includes at least one resource set, and each resource set includes at least one CSI-RS resource; and the target measurement includes channel measurement or interference measurement.

In FIG. 14, a bus architecture may include any number of interconnected buses and bridges, specifically various circuits such as one or more processors represented by the processor 1401 and a memory represented by the storage 1403 are linked together. The bus architecture may also link together various other circuits, such as peripheral devices, voltage regulators, and power management circuits, which are well known in the art, and thus will not be described further herein. The bus interface provides an interface. The transceiver 1402 may be a plurality of elements, i.e., including a transmitter and a receiver, for providing elements for communicating with various other devices over a transmission medium.

The processor 1401 is responsible for managing the bus architecture and general processing, and the storage 1403 may store data used by the processor 1401 when performing operations.

Optionally, when the processor 1401 reads the program in the storage 1403, the processor 1401 further implements: sending, to a terminal through the transceiver 1402, an indication parameter for determining a target CSI-RS port set for the target measurement; wherein the indication parameter is carried in at least one of a Radio Resource Control (RRC) signaling, a Medium Access Control (MAC) Control Element (CE), and Downlink Control Information (DCI).

Specifically, the indication parameter is used to indicate one of the following: whether the target CSI-RS port set is determined by all CSI-RS ports of all CSI-RS resources in the same resource set in the resource configuration information; whether the target CSI-RS port set is determined by a CSI-RS port of a predetermined CSI-RS resource in the same resource set in the resource configuration information, and in a case where the indication parameter indicates that the target CSI-RS port set is determined by a CSI-RS port of a predetermined CSI-RS resource in the same resource set in the resource configuration information, the indication parameter further includes identification information of the predetermined CSI-RS resource used for determining the target CSI-RS port set; identification information of a CSI-RS resource, used for determining the target CSI-RS port set, in the same resource set in the resource configuration information; identification information of a CSI-RS port, used for determining the target CSI-RS port set, in a CSI-RS resource in the same resource set of the resource configuration information.

Specifically, when the indication parameter indicates identification information of a CSI-RS port, used for determining the target CSI-RS port set, in a CSI-RS resource in the same resource set in the resource configuration information, the indication parameter is further used to indicate identification information of a CSI-RS resource where the CSI-RS port corresponding to the identification information of the CSI-RS port is located.

The network device may be a Base Transceiver Station (BTS) in a Global System of Mobile Communication (GSM) or a Code Division Multiple Access (CDMA) system, or may be a NodeB (NB) in a Wideband Code Division Multiple Access (WCDMA) system, an Evolved Node B (eNB or eNodeB) in a Long Term Evolution (LTE), or a relay station or an access point, or a base station in a future 5G network. The present disclosure is not limited thereto.

It should be noted that such terms as "include", "comprise", or any other variation thereof are intended to encompass non-exclusive inclusion, so that processes, methods, articles or devices including a series of elements include not only those elements but also other elements not explicitly listed, or may also include elements inherent to such processes, methods, articles, or devices. In the absence of further limitations, if an element is subsequent to a statement as "including one . . . ", coexistence of another identical element in a process, a method, an article, or a device that includes the element is not excluded.

From the above description of the embodiments, it will be apparent to those skilled in the art that methods in the above embodiments may be implemented by means of software plus a common necessary hardware platform, and of course may also be implemented by hardware, but in many cases the former is a better implementation. Based on such an understanding, an essential part or a part contributing the related art in technical solutions of the present disclosure may be embodied in a form of a software product. The computer software product is stored in a storage medium such as an ROM/RAM, a magnetic disk, an optical disk, and includes instructions for enabling a terminal (which may be a mobile phone, a computer, a server, an air conditioner, or a network device or the like) to perform the methods described in various embodiments of the present disclosure.

What is described above are optional embodiments of the present disclosure. It should be noted that several improvements and embellishments may also be made by those of ordinary skill in the art without departing from the principles of the present disclosure, these improvements and embellishments are also within the protection scope of the present disclosure.

What is claimed is:

1. A measurement method, comprising:
   obtaining resource configuration information for performing target measurement;
   obtaining an indication parameter for determining a target Channel State Information Reference Signal (CSI-RS) port set for the target measurement;
   determining the target CSI-RS port set in the resource configuration information according to the indication parameter; and
   obtaining a target measurement value corresponding to the target CSI-RS port set through performing measurement;
   wherein the resource configuration information comprises at least one resource set, and each resource set comprises at least one CSI-RS resource, and the target measurement comprises channel measurement or interference measurement;
   the indication parameter is used to indicate whether the target CSI-RS port set is determined by all CSI-RS ports of all CSI-RS resources in a same resource set in the resource configuration information;
   wherein the determining the target CSI-RS port set in the resource configuration information according to the indication parameter, comprises:
   when the indication parameter indicates that the target CSI-RS port set is determined by all CSI-RS ports of all CSI-RS resources in the same resource set in the resource configuration information, determining all CSI-RS ports of all CSI-RS resources in the same resource set in the resource configuration information as one target CSI-RS port set.

2. The measurement method according to claim 1, wherein obtaining the indication parameter for determining the target CSI-RS port set for the target measurement comprises:
   receiving the indication parameter, sent by a network device, for determining the target CSI-RS port set for the target measurement;
   wherein the indication parameter is carried in at least one of following:
   a Radio Resource Control (RRC) signaling, an Medium Access Control (MAC) Control Element (CE), or Downlink Control Information (DCI).

3. The measurement method according to claim 1, wherein the indication parameter is used to further indicate one of following information:
   identification information of a CSI-RS resource, used for determining the target CSI-RS port set, in a same resource set in the resource configuration information;
   identification information of a CSI-RS port, used for determining the target CSI-RS port set, in one CSI-RS resource in a same resource set in the resource configuration information.

4. The measurement method according to claim 3, wherein, in a case where the indication parameter indicates identification information of a CSI-RS port, used for determining the target CSI-RS port set, in a CSI-RS resource in the same resource set in the resource configuration information, the indication parameter is further used to indicate identification information of a CSI-RS resource where a CSI-RS port corresponding to the identification information of the CSI-RS port is located.

5. A non-transitory computer readable storage medium, comprising:
   a program stored on the computer readable storage medium, wherein when the program is executed by a processor, the processor performs the measurement method according to claim 1.

6. The non-transitory computer readable storage medium according to claim 5, wherein, obtaining the indication parameter for determining the target CSI-RS port set for the target measurement comprises:
   receiving the indication parameter, sent by a network device, for determining the target CSI-RS port set for the target measurement;
   wherein the indication parameter is carried in at least one of following:
   a Radio Resource Control (RRC) signaling, an Medium Access Control (MAC) Control Element (CE), or Downlink Control Information (DCI).

7. The non-transitory computer readable storage medium according to claim 5, wherein, obtaining the indication parameter for determining the target CSI-RS port set for the target measurement comprises:
   receiving the indication parameter, sent by a network device, for determining the target CSI-RS port set for the target measurement;
   wherein the indication parameter is carried in at least one of following:
   a Radio Resource Control (RRC) signaling, an Medium Access Control (MAC) Control Element (CE), or Downlink Control Information (DCI).

8. The non-transitory computer readable storage medium according to claim 5, wherein the indication parameter is used to further indicate one of following information:
   identification information of a CSI-RS resource, used for determining the target CSI-RS port set, in a same resource set in the resource configuration information;

identification information of a CSI-RS port, used for determining the target CSI-RS port set, in one CSI-RS resource in a same resource set in the resource configuration information.

9. The non-transitory computer readable storage medium according to claim 8, wherein, in a case where the indication parameter indicates identification information of a CSI-RS port, used for determining the target CSI-RS port set, in a CSI-RS resource in the same resource set in the resource configuration information, the indication parameter is further used to indicate identification information of a CSI-RS resource where a CSI-RS port corresponding to the identification information of the CSI-RS port is located.

10. A measurement configuration method, comprising:
sending resource configuration information for target measurement to a terminal;
sending, to the terminal, an indication parameter for determining a target Channel State Information Reference Signal (CSI-RS) port set for the target measurement;
wherein the resource configuration information comprises at least one resource set, and each resource set comprises at least one CSI-RS resource; and the target measurement comprises channel measurement or interference measurement,
the indication parameter is used to indicate whether the target CSI-RS port set is determined by all CSI-RS ports of all CSI-RS resources in a same resource set in the resource configuration information.

11. The measurement configuration method according to claim 10,
wherein, the indication parameter is carried in at least one of following:
a Radio Resource Control (RRC) signaling, a Medium Access Control (MAC) Control Element (CE), or Downlink Control Information (DCI).

12. The measurement configuration method according to claim 11, wherein the indication parameter is used to further indicate one of the following:
identification information of a CSI-RS resource, used for determining the target CSI-RS port set, in a same resource set in the resource configuration information;
identification information of a CSI-RS port, used for determining the target CSI-RS port set, in a CSI-RS resource in a same resource set of the resource configuration information.

13. The measurement configuration method according to claim 12, wherein, when the indication parameter indicates identification information of a CSI-RS port, used for determining the target CSI-RS port set, in a CSI-RS resource in the same resource set in the resource configuration information, the indication parameter is further used to indicate identification information of a CSI-RS resource where a CSI-RS port corresponding to the identification information of the CSI-RS port is located.

14. A network device, comprising:
a storage, a processor, and a computer program stored on the storage and executed by the processor, wherein when the computer program is executed by the processor, the processor implements steps of the measurement configuration method according to claim 10.

15. A non-transitory computer readable storage medium, comprising:
a program stored on the computer readable storage medium, wherein when the program is executed by a processor, the processor performs the measurement configuration method according to claim 10.

16. The non-transitory computer readable storage medium according to claim 4, wherein, the indication parameter is carried in at least one of following:
a Radio Resource Control (RRC) signaling, a Medium Access Control (MAC) Control Element (CE), or Downlink Control Information (DCI).

17. The non-transitory computer readable storage medium according to claim 16, wherein the indication parameter is used to further indicate one of the following:
identification information of a CSI-RS resource, used for determining the target CSI-RS port set, in a same resource set in the resource configuration information;
identification information of a CSI-RS port, used for determining the target CSI-RS port set, in a CSI-RS resource in a same resource set of the resource configuration information.

18. A terminal, comprising:
a storage, a processor, and a computer program stored on the storage and executed by the processor, wherein when the computer program is executed by the processor, the processor implements a measurement method, the measurement method comprises following steps:
obtaining resource configuration information for performing target measurement;
obtaining an indication parameter for determining a target Channel State Information Reference Signal (CSI-RS) port set for the target measurement;
determining the target CSI-RS port set in the resource configuration information according to the indication parameter; and
obtaining a target measurement value corresponding to the target CSI-RS port set through performing measurement;
wherein the resource configuration information comprises at least one resource set, and each resource set comprises at least one CSI-RS resource, and the target measurement comprises channel measurement or interference measurement,
indication parameter is used to indicate whether the target CSI-RS port set is determined by all CSI-RS ports of all CSI-RS resources in a same resource set in the resource configuration information,
wherein the determining the target CSI-RS port set in the resource configuration information according to the indication parameter, comprises,
when the indication parameter indicates that the target CSI-RS port set is determined by all CSI-RS ports of all CSI-RS resources in the same resource set in the resource configuration information, determining all CSI-RS ports of all CSI-RS resources in the same resource set in the resource configuration as one target CSI-RS port set.

19. The terminal according to claim 18, wherein obtaining the indication parameter for determining the target CSI-RS port set for the target measurement comprises:
receiving the indication parameter, sent by a network device, for determining the target CSI-RS port set for the target measurement;
wherein the indication parameter is carried in at least one of following:
a Radio Resource Control (RRC) signaling, an Medium Access Control (MAC) Control Element (CE), or Downlink Control Information (DCI).

20. The terminal according to claim 18, wherein the indication parameter is used to further indicate one of following information:

identification information of a CSI-RS resource, used for determining the target CSI-RS port set, in a same resource set in the resource configuration information;

identification information of a CSI-RS port, used for determining the target CSI-RS port set, in one CSI-RS resource in a same resource set in the resource configuration information.

\* \* \* \* \*